ALTERNATE SUPPORTING MEANS FOR ANNULAR WORKPIECES
Filed April 17, 1959 2 Sheets-Sheet 1
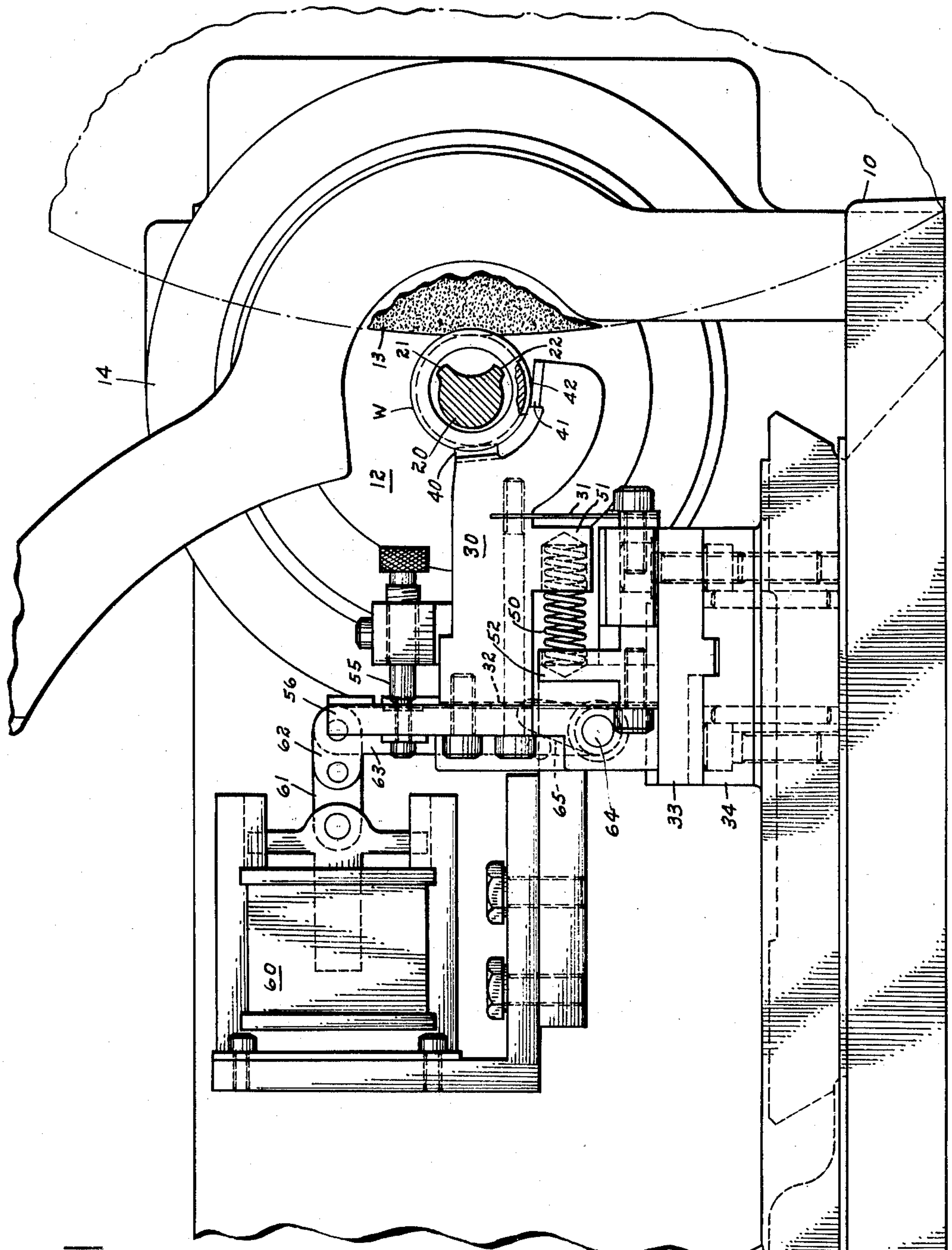
INVENTOR
HAROLD E. BALSIGER
BY Hugh N. Rocker
ATTORNEY June 18, 1963 H. E. BALSIGER 3,093,938
ALTERNATE SUPPORTING MEANS FOR ANNULAR WORKPIECES
Filed April 17, 1959 2 Sheets-Sheet 2
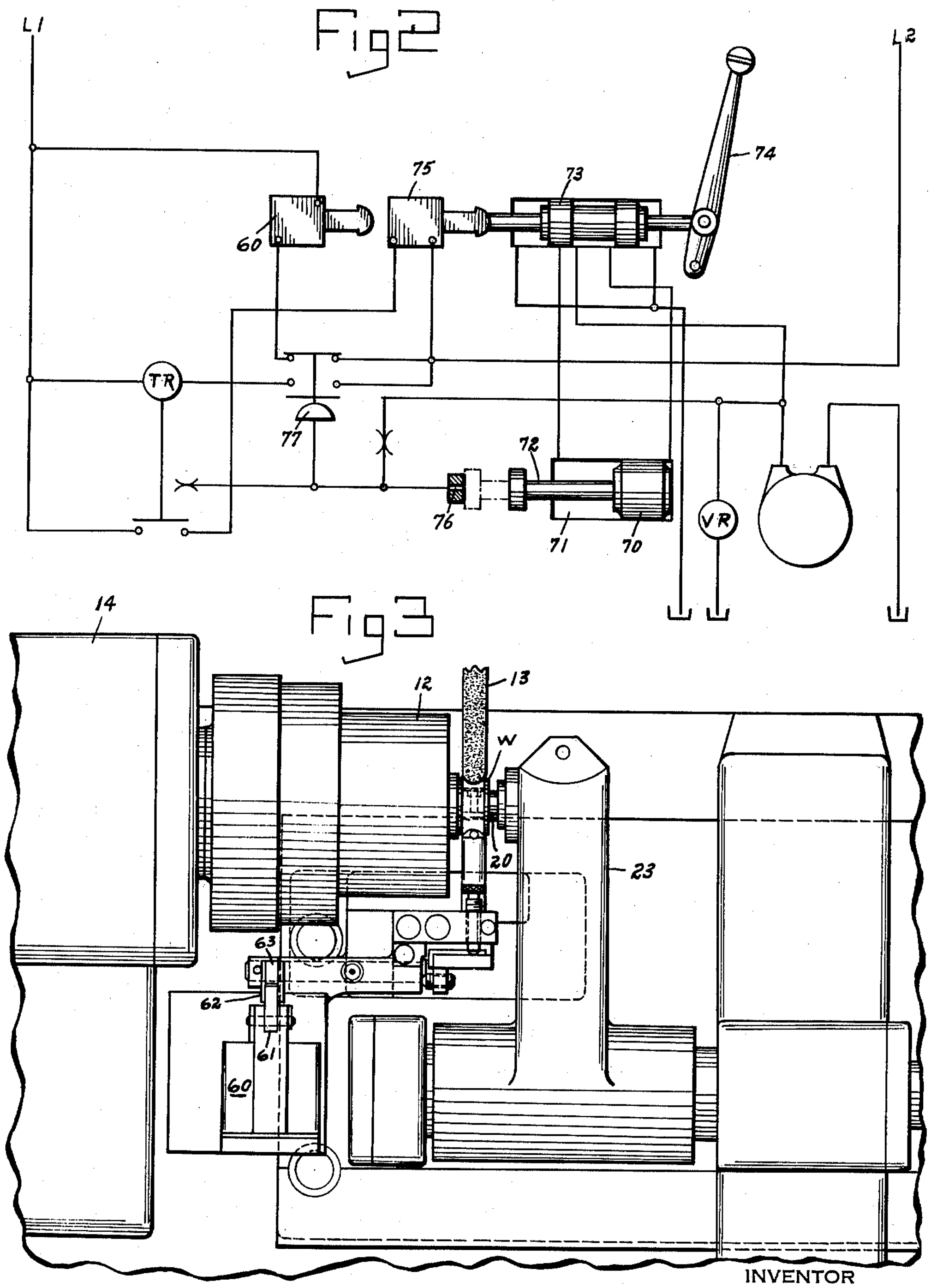
INVENTOR
HAROLD E. BALSIGER
BY Hugh N Rocker
ATTORNEY 3,093,938
Patented June 18, 1963

3,093,938
ALTERNATE SUPPORTING MEANS FOR ANNULAR WORKPIECES

Harold E. Balsiger, Waynesboro, Pa., assignor to Landis Tool Company, Waynesboro, Pa.

Filed Apr. 17, 1959, Ser. No. 807,056
3 Claims. (Cl. 51—103)

This invention relates to grinding machines, particularly to grinding machines of the type in which annular workpieces are supported on the internal and external peripheral surfaces and rotated through engagement of the end face with a rotatable face plate.

Similar machines are shown in Patent 2,694,883 granted November 23, 1954, Patent 2,760,312 granted August 28, 1956 and Patent 2,799,977 granted July 23, 1957.

In Patent 2,694,883, the grinding wheel is fed against the work while during the entire grinding operation, a workpiece is supported by peripherally spaced shoes engaging its internal surface.

In Patent 2,760,312, there is an apparatus and method for grinding the workpiece first while it is supported at peripherally spaced points on its internal surface and thereafter completing the grinding operation with the work supported at one point on the internal surface and at one point on the external surface.

In Patent 2,799,977, the grinding wheel is fed against the work which is supported by peripherally spaced shoes engaging its internal surface until the work is ground almost to size and the feed of the grinding wheel is stopped. Then, a third shoe moves into engagement with the external surface of the work and feeds said work out of contact with one of the internal supporting shoes and against the grinding wheel.

The present invention represents an improvement over the apparatus in the above mentioned patents in that it makes possible a higher quality finish on the work surface. This is accomplished by the support of the work being transferred completely from the peripherally spaced internal supporting shoes to peripherally spaced external supporting shoes as the external supporting shoes engage and feed the work against the grinding wheel.

It is, therefore, an object of this invention to provide in a machine for grinding annular workpieces, means for supporting a workpiece in such a manner as to provide an improvement in the quality of surface finish, roundness, and size of a workpiece.

Another object is to provide one means for supporting a workpiece during part of the grinding operation and another means for supporting said workpiece during a subsequent porton of the grinding operation.

Another object is to provide means for supporting the workpiece on one peripheral surface during a part of the grinding operation and on the other peripheral surface during a subsequent part of the grinding operation.

Another object is to provide means for transferring the support of the workpiece from one pair of peripherally spaced shoes to a second pair of peripherally spaced shoes.

Another object is to provide means for transferring the support of a workpiece from the peripherally spaced shoes engaging one portion of the workpiece to the peripherally spaced shoes engaging another portion of said workpiece.

FIGURE 1 is an end elevation, partly in section, of the work supporting and driving elements.

FIGURE 2 is a hydraulic and electric circuit for controlling and effecting the operation of the work supporting means.

FIGURE 3 is a partial plan view of a grinding machine showing the relation between the peripheral supporting means, the work driving means and the loading arm.

Numeral 10 indicates the carriage or swivel table of a grinding machine. 11 is a base member for a work supporting device. Face plate 12, preferably of the magnetic type, is rotatably supported on headstock 14 for rotatably supporting workpiece W in operative relation to grinding wheel 13. Work arbor 20 having work engaging shoes 21 and 22 for engaging the internal peripheral surface of workpiece W, is mounted on a pivotal arm 23 similar to that disclosed in the above mentioned patents.

The external supporting means consists of a member 30 mounted on vertical parallel leaf springs 31 and 32 which, in turn, are attached to a base member consisting of an upper portion 33 mounted for longitudinal adjustment on portion 34 which, in turn, is attached to base member 11.

Member 30 is similar to member 33 disclosed in Patent 2,799,977 except that it has in addition to the work engaging shoe 40, a second angularly spaced shoe 41 for engaging and supporting workpiece W against the downward thrust of grinding wheel 13.

The upper surface 42 of work engaging shoe 41 is inclined downwardly toward grinding wheel 13 so that as member 30 moves forward to carry workpiece W against grinding wheel 13, it provides a slight upward component to insure contact with the work as it is ground and thus to support the work vertically. Work engaging shoe 40 contacts workpiece W, preferably on or slightly above the horizontal line passing through the point of contact between grinding wheel 13 and workpiece W.

The means for moving member 30 toward grinding wheel 13 consists of a spring 50, one end of which engages projection 51 on the underside of member 30. The other end of spring 50 engages an upward projection 52 on upper portion 33. Movement of member 30 in response to spring 50 is limited by an adjustable stop 55 on upper portion 33 in the path of an upwardly extending portion 56 on member 30.

The means for holding member 30 away from workpiece W consists of a solenoid 60 connected by suitable links 61, 62 and 63. Link 63 is attached to rotatable shaft 64 which carries arm 65 in operative engagement with member 30.

Means for advancing grinding wheel 13 toward workpiece W is similar to that disclosed in Patent 2,799,977 and consists of piston 70 in cylinder 71. Piston 70 is connected through piston rod 72 to a wheel support (not shown) on which grinding wheel 13 is rotatably mounted.

A manually operated reversing valve 73 is provided for directing fluid under pressure from a hydraulic pump alternately to opposite ends of cylinder 71. Valve 73 is moved in one direction by lever 74 and in the other direction by solenoid 75. Lever 74 is used for the purpose of illustration and does not exclude the use of other operating means such as a push button device or automatic control means actuated as a function of an automatic cycle.

When piston 70 moves grinding wheel 13 to grinding position, piston rod 72 acts on a fluid jet 76 to operate a pressure switch 77 and also to stop piston rod 72 and grinding wheel 13. Said pressure switch closes one contact to energize a timer and opens another contact to deenergize solenoid 60 to permit member 30 to be fed into engagement with workpiece W by spring 50. The timer functions after a predetermined interval sufficient to permit member 30 to move workpiece W against grinding wheel 13 for a finish grinding operation. At the end of the interval, the timer times out and actuates solenoid 75 to withdraw grinding wheel 13 from workpiece W.

I claim:

1. In a grinding machine for grinding cylindrical workpieces having more than one peripheral surface, a grinding wheel, a work drive spindle, a face plate on said work drive spindle, means for holding a workpiece against said face plate, work supporting means comprising a work supporting member having angularly spaced work engaging shoes for engaging one peripheral surface of the workpiece, a second work supporting member having angularly spaced work engaging shoes for engaging another peripheral surface of said workpiece, and means for moving said second work supporting member to move said workpiece against said grinding wheel and out of engagement with said first work supporting member and means to stop said second work supporting member when said workpiece is ground to the desired size.

2. In a grinding machine for grinding cylindrical workpieces having more than one peripheral surface, a grinding wheel and means for rotating said grinding wheel, a work drive spindle and means for rotating said work drive spindle, means on said spindle for engaging and rotating a workpiece, a work rest member having peripherally spaced work engaging shoes mounted to support a workpiece on one of said peripheral surfaces, a second work rest member having peripherally spaced shoes for engaging another peripheral surface of the workpiece, means for supporting said workpiece on one of said work rest members for part of a grinding operation and means for transferring said workpiece from said first work rest member to said second work rest member for the remainder of said grinding operation.

3. In a grinding machine for grinding cylindrical workpieces having more than one peripheral surface, a rotatable grinding wheel, a rotatable work drive spindle, means on said spindle for engaging and rotating a workpiece, a work rest member having peripherally spaced work engaging shoes mounted to support a workpiece on one of said peripheral surfaces, a second work rest member having peripherally spaced shoes for engaging another peripheral surface of the workpiece, and control means operable before the workpiece is ground to size for advancing said second work rest member to transfer the workpiece from said first work engaging shoes to said second work engaging shoes for a finish grinding operation.

References Cited in the file of this patent

UNITED STATES PATENTS

| | | |
|---|---|---|
| 732,314 | Norton | June 30, 1903 |
| 2,799,977 | Jones et al. | July 23, 1957 |
| 2,909,009 | Schmidt et al. | Oct. 20, 1959 |